May 20, 1930.  A. L. N. FLEMING  1,759,822
LINKING MACHINE
Filed Sept. 20, 1928  2 Sheets-Sheet 1
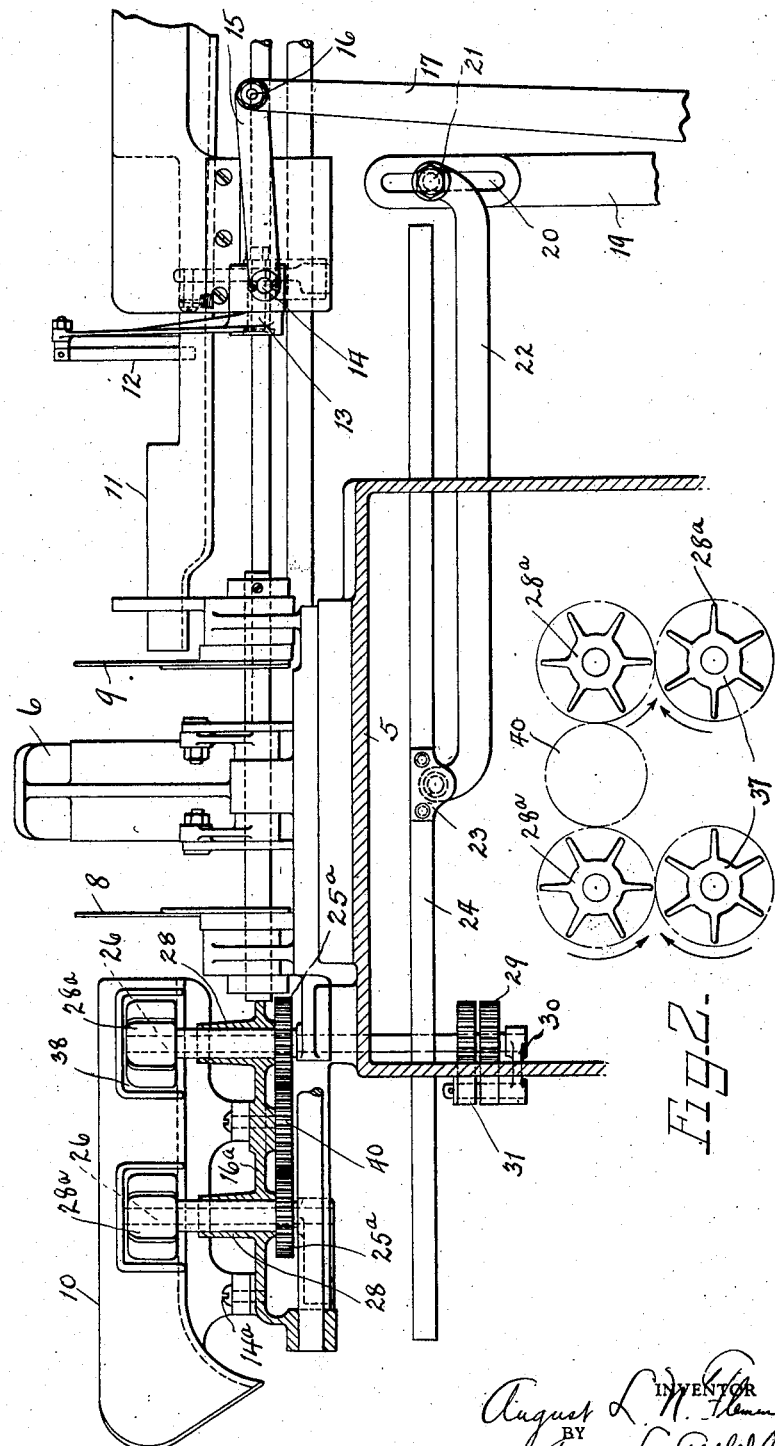

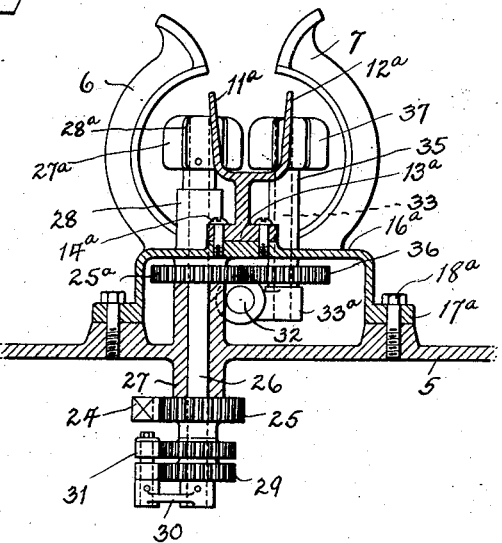
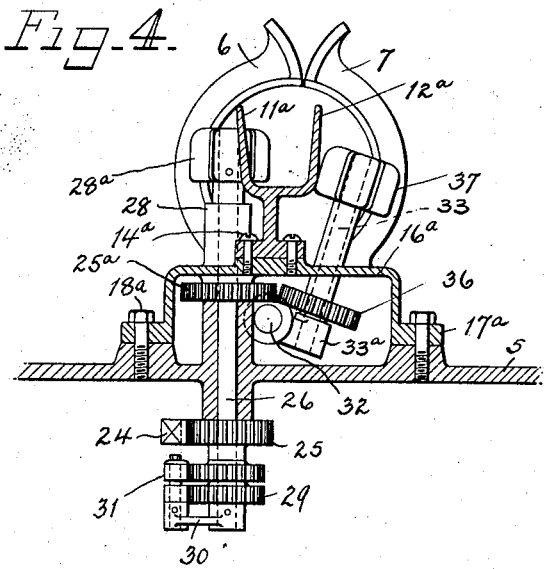

Patented May 20, 1930

1,759,822

UNITED STATES PATENT OFFICE

AUGUST L. N. FLEMING, OF CARTHAGE, NEW YORK, ASSIGNOR TO SUPERIOR LINKING MACHINE CORPORATION, OF WILMINGTON, DELAWARE, A CORPORATION OF DELAWARE

LINKING MACHINE

Application filed September 20, 1928. Serial No. 307,315.

This invention relates to automatic sausage linking or twisting machines and particularly of the type wherein a stuffed or filled casing or tube may be formed into uniform links and the material solidly packed or compressed without damaging the casing or tube in its passage through the machine.

In my copending application, filed April 29, 1927, Sr. No. 187,676, I have shown and described a sausage, linking, or twisting machine which briefly consists of a guide or feeding chute or trough, a pair of adjustable dividers, a rotor between the dividers and a distributer mechanism for advancing the links when the dividers are open and the rotor is disengaged from said casing including intermittently operated, timed gearing producing an automatic machine.

The present invention and improvement is directed to the feeding chute or trough whereby the material in the stuffed casing or tube is solidly compressed or packed in advance of the dividers and rotor to produce more uniform links and a better appearing product.

As the result of many experiments with both natural and artificial sausage casings, it has been found that the poor appearance of the product is due to the stretching or expansion of the casing after it has passed through the machine. The main difficulty in handling filled animal casings for instance, is that they are subject to be easily split or broken due to the variation in their tensile strength. When the casing is split or broken, it becomes necessary to cut or block out the link at a considerable loss of time and labor with the result that the packer is careful not to place any appreciable stress or strain on the casing while being filled.

My invention therefore relates to automatic mechanism for engaging the filled casing during its passage in the machine toward the dividers and rotor whereby the material may be solidly packed or compressed without splitting or fracturing the casing.

More specifically, one of the objects of my invention is to provide a pair or series of opposed fluted rollers or spiders lying partially within the path of a filled casing as it travels in the guide or feed chute or trough to compress and pack the material.

A further object of my invention is to provide compressing or packing means for a filled, endless casing, constructed and arranged in timed relation with the dividers, rotor and distribution mechanism of a sausage linking or twisting machine.

To enable others skilled in the art to more fully comprehend the underlying features of my invention and its application to machines of the type above set forth, reference is had to the accompanying drawing showing a preferred embodiment of the invention wherein Fig. 1 is a partial front view of the machine, parts being shown in section and illustrating my invention.

Fig. 2 is a view showing the relative location of the spiders or fluted rollers.

Fig. 3 is a sectional view showing operative position of the spiders or fluted rollers.

Fig. 4 is a sectional view showing the inoperative position of the spiders or fluted rollers.

Referring now to the drawings wherein like reference characters designate corresponding parts throughout the several views, 5 designates the upper portion of a frame or housing for confining the driving mechanism including the time gearing (not shown) but fully illustrated and described in my copending application, above identified. The frame supports a rotor bracket 6 and a rotor hinge 7 cooperating therewith which is opened and closed in timed relation with a pair of adjustable dividers 8, 9, said rotor bracket, rotor hinge and dividers being located between a guide or feed chute or trough 10 and a discharge chute or trough 11 as clearly shown by Fig. 1 of the drawings.

Cooperating with the discharge chute is a distribution mechanism comprising distributor clamp 12, connected to a distributor clamp pin 13 and distributor operating pin 14 at one end of a distributor link 15, the opposite end of said link being connected to a distributor lever pin 16 located at the extreme upper extremity or end of a discharge lever 17. The lever is adapted to rock longitudinally back and forward so as to carry the distributor clamp toward the divider 9 and thus advance the links in the discharge chute. The operation of the distributor lever is timed in accordance with the open and closed positions of the dividers.

The guide feed chute or trough 10 is substantially U-shaped in cross section, the side walls 11ª, 12ª flaring slightly outwardly. The base 13ª of the guide is fastened by screws 14ª to the top 15ª of a gear housing 16ª, the flanges 17ª of said gearing housing being secured by threaded bolts 18ª to the main frame or support.

The machine also includes a vertical rack lever 19, the upper portion of which is in advance of the discharge lever but adapted to be rocked therewith on a common bearing (not shown). The upper end of the rack lever is provided with an elongated slot 20 for receiving an adjustable pin 21 on one end of a rack link 22. The opposite end of the rack link is attached to a plate 23 fastened to a longitudinal feed rack 24.

The rack 24 is in mesh with a rotary gear 25 keyed to a vertical shaft 26 extending through a bushing 27 of the frame or housing and a bushing 28 on the gear housing. Fastened to the upper end of the vertical shaft 26 is a fluted roller or spider 27ª having a series of flat vanes with rounded or blunt edges 28ª to directly engage the material or casing without breaking the same as it is fed through the entrance guide or delivery trough or chute. The lower end of the shaft 26 also carries a ratchet wheel 29 and a cooperating ratchet lever 30 and ratchet pawl 31.

Referring to Figs. 3 and 4 of the drawings, it will be noted that the rotor hinge 7 is mounted on a hinge shaft 32 extending within the gear housing which is intermittently rocked by suitable gearing (not shown), in timed relation with the dividers. A shaft bearing 33ª is connected to the shaft 32 and supports the lower end of a stationary spider stud 33 extending upwardly in a boss 34 of the gear housing. Rotatably mounted on the stud is a sleeve 35 and fixed to the sleeve is a toothed gear 36. The upper end of the sleeve 35 carries a fluted roller or spider 37 similar to the roller or spider 27ª having a series of flat vanes with rounded or blunt edges to directly engage the material or casing without breaking or fracturing the same. Rotary motion is imparted to the gear 36 by a rotary gear 25ª keyed on the shaft 26.

It will be noted that in Fig. 3 the rotor hinge is in its open position, at which interval the fluted rollers or spiders 37 are operative, whereas in Fig. 4 the rotor hinge is in its closed position and the fluted rollers or spiders are inoperative. In other words, it is desired to compress or pack a section of the material in the casing just prior to its delivery to the twisting mechanism between the rotor bracket and the rotor hinge. When the rotor bracket and rotor hinge, however, are closed, as indicated by Fig. 4, it is desired to interrupt the compression and feeding of the casing which is accomplished by mounting the rotor hinge 7 and the shaft bearing 33ª on the same hinged shaft 32. In order for the spiders or fluted rollers to directly engage the casing or material, the entrance guide or feed chute is equipped with a series of openings 38 in the side walls for the operation of the vanes. The vertical shafts supporting the spiders or fluted rollers and the rotatable sleeve are located outside the entrance or feed chute but the vanes are of such size and dimensions that they extend partially within the passage of the guide to engage the casing.

The relative arrangement of the spiders or fluted rollers shown in Fig. 2, for instance permits the front and rear spiders to be simultaneously driven through an intermediate drive gear 40 which meshes with the gearing of one set of spiders. It will also be noted that the vanes of the spiders or fluted rollers are set so that in operative position, and when engaging the casing or material, the same may pass therethrough or between the blunt edges but since the diameter of the casing is greater than the space between the edges of the opposed vanes, the material will be compressed or packed tightly during its passage to the twisting mechanism, the spiders or rollers operating in opposite directions as indicated by the arrows in Fig. 2.

It has been found that due to the packing of the material in the casing by the fluted rollers or spiders operating in unison with the discharge lever and distribution clamp, that a slight stress or strain is exerted on the casing when the twisting or rotation of the links is effected. Consequently it is often necessary to adjust the rack link and rack lever to increase the length of movement of the gear rack so as to permit the fluted rollers or spiders to travel somewhat faster to offset the pull by the distribution clamp and discharge lever. This adjustment is quite important by reason of the use of animal casings having different degrees of flexibility and tensile strength. In other words there is somewhat of a shortening of the casing due to the twisting of the links which must be compensated for by an increased speed in the feeding and packing of the material by the fluted rollers. The packing or compression of the soft material by one of the vanes between the opposed or opposite vanes is at right angles to the line of travel of the casing, the spiders of one set traveling in the opposite direction to the complementary spiders.

From the above description, the operation of the machine will become apparent as the filled casing is introduced into the guide or feed chute. The casing passes between the vanes of the rollers or spiders and by reason of the blunt edges, the material is packed tightly in the casing in advance of its engagement by the dividers and the twisting mechanism between the bracket and rotor hinge, which are in their open position. The reciprocation of the vertical rack lever 19 and the longitudinal feed rack 24 drives the gearing, whereby all of the fluted rollers are operated. At the moment when the rotor hinge 7 closes, the front set of spiders 37 become inoperative as the rotor gears 36 are disengaged from the gears 25ª of the opposed shafts 26 carrying the opposite set of spiders. Due to the fact that the bearing 33ª is mounted on the hinge 32 of the hinged bracket 7, when the spiders are in their inoperative position, dividers 8, 9, and the twisting mechanism begin to function. When the hinged bracket 7 again opens, the spiders are again rendered operative at which moment the distribution mechanism draws the link partially through the discharge chute 11.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention, what I claim as new and desire to secure by Letters Patent is:—

1. In a linking machine having a stationary guide for receiving one end of a filled casing and means for compressing the filling within a section of said casing during its passage in said guide.

2. In a linking machine having a fixed entrance guide for receiving one end of a filled casing and rotary means for compressing the filling within a section of said casing during its passage in said guide.

3. In a linking machine having a guide for receiving one end of a filled casing and means for intermittently compressing a section of said casing during its passage in said guide.

4. In a linking machine having a guide for receiving one end of a filled casing, rotary means for compressing a section of said casing during its passage in said guide and means for intermittently operating said rotary means.

5. In a linking machine having a guide for receiving one end of a filled casing and means on opposite sides of said guide for compressing a section of a casing passing between said means in its travel through the guide.

6. In a linking machine having a guide for receiving one end of a filled casing, rotary members on opposite sides of said guide for compressing a section of said casing in its passage between said rotary members and means for driving said rotary members.

7. In a linking machine having a guide for receiving one end of a filled casing, rotary members on opposite sides of said guide for compressing a section of said casing in its passage between said rotary members and means for intermittently driving said members.

8. In a linking machine having a guide for receiving one end of a filled casing, a plurality of rotary members on opposite sides of said guide for compressing a section of said casing in its passage therethrough and between the said rotary members and means for driving said rotary members.

9. In a linking machine having a guide for receiving one end of a filled casing, opposed rotary members on opposite sides of said guide for compressing a section of said casing in its passage therethrough and between the rotary member and intermittently operable gearing for driving said rotary members.

10. In a linking machine having a guide for receiving one end of a filled casing, rotary members extending partially in said guide for compressing a section of said casing during its travel in the guide and means for driving said rotary members.

11. In a linking machine having a guide for receiving one end of a filled casing, rotary members operable through recesses in the sides of the guide for engaging a section of said casing in its passage therethrough and means for driving said rotary members.

12. In a linking machine having a guide for receiving one end of a filled casing, a plurality of rotary members operable through recesses in the sides of the guide for engaging a section of said casing in its passage therethrough, means for driving said rotary members and means for intermittently rendering said rotary members inoperative.

13. In a linking machine having a guide for receiving one end of a filled casing, two sets of rotary members operable through recesses in the sides of the guide for engaging a section of said casing in its passage therethrough, means for driving said rotary members and means for intermittently rocking one set of rotary members out of engagement with the said casing during its travel in the guide.

14. In a linking machine having a guide for receiving one end of a filled casing and a series of fluted rollers for compressing and advancing said casing in its travel through the guide.

15. In a linking machine having a guide for receiving one end of a filled casing, two sets of fluted rollers for compressing a section of said casing passing therebetween and means for driving said rollers in opposite directions to advance said casing in the said guide.

16. In a linking machine having a twisting mechanism, a guide for receiving one end of a filled casing in advance of said twisting mechanism, a distribution mechanism rearwardly of the twisting mechanism, rotary members for compressing a section of said casing during its passage in the guide and means for regulating the speed of said rotary members.

17. In a linking machine having a twisting mechanism, a guide for receiving one end of a filled casing in advance of said twisting mechanism, a reciprocating distribution mechanism rearwardly of the twisting mechanism, rotary members for compressing a section of said casing during its passage in the guide and means for varying the speed of said rotary members in accordance with the speed of said reciprocating mechanism.

18. In a linking machine having a twisting mechanism including a rotor bracket and a rotor hinge member adapted to open and close, a guide for receiving one end of a filled casing in advance of said twisting mechanism, rotary members for compressing a section of said casing during its passage in said guide, and means for driving said rotary members when the rotor brackets and rotor hinge are open.

19. In a linking machine having a twisting mechanism including a rotor bracket and a rotor hinge member adapted to intermittently open and close, a guide for receiving one end of a filled casing in advance of said twisting mechanism, two sets of rotary members for compressing a section of said casing during its passage in said guide, means for driving said rotary members when the rotor bracket and rotor hinge are open and to render said rotary members inoperative when the rotor bracket and rotor hinge are closed.

20. In a linking machine having a twisting mechanism including a rotor bracket and a rotor hinge, a shaft on which said rotor hinge is mounted, a guide for receiving one end of a filled casing in advance of said twisting mechanism, two sets of rotary members for compressing a section of said casing during its passage in said guide, gearing for driving said rotary members, one set of said rotary members being mounted on said shaft and means for intermittently reciprocating said shaft whereby the rotary members are rendered operative when the rotor bracket and rotor hinge are open and inoperative when the rotor bracket and rotor hinge are closed.

In testimony whereof I affix my signature.

AUGUST L. N. FLEMING.